United States Patent [19]

Miyawaki

[11] Patent Number: 4,787,489

[45] Date of Patent: Nov. 29, 1988

[54] SYSTEM FOR CONTROLLING AN ELECTROMAGNETIC CLUTCH FOR A VEHICLE

[75] Inventor: Motohisa Miyawaki, Chofu, Japan

[73] Assignee: Fuji Jukogyo Kabushiki Kaisha, Tokyo, Japan

[21] Appl. No.: 27,830

[22] Filed: Mar. 19, 1987

[30] Foreign Application Priority Data

Mar. 31, 1986 [JP] Japan .................................. 61-73687

[51] Int. Cl.⁴ ........................ B60K 41/22; F16D 27/16
[52] U.S. Cl. ............................. 192/0.052; 192/0.076; 192/0.092; 192/21.5
[58] Field of Search ................. 192/21.5, 0.076, 0.052, 192/0.092

[56] References Cited

U.S. PATENT DOCUMENTS

| | | | |
|---|---|---|---|
| 4,425,992 | 1/1984 | Makita | 192/21.5 X |
| 4,494,641 | 1/1985 | Sakakiyama | 192/0.076 |
| 4,605,112 | 8/1986 | Takano | 192/21.5 X |
| 4,618,037 | 10/1986 | Nishikawa et al. | 192/0.092 X |
| 4,662,496 | 5/1987 | Sakakiyama | 192/21.5 X |
| 4,680,712 | 7/1987 | Sakakiyama et al. | 192/0.076 X |

Primary Examiner—Rodney H. Bonck
Attorney, Agent, or Firm—Martin A. Farber

[57] ABSTRACT

A system for slipping an electromagnetic clutch when a motor vehicle is driven at a low speed in a closed choke valve condition. The system is provided with a choke switch for producing a choke signal, accelerator pedal position switch for producing a release signal and a vehicle speed signal detector in order to reduce current passing in the clutch to cause the clutch to slip at the release of an accelerator pedal in a low vehicle speed range. The slipping is controlled to keep the vehicle speed constant.

3 Claims, 11 Drawing Sheets

SYSTEM FOR CONTROLLING AN ELECTROMAGNETIC CLUTCH FOR A VEHICLE

BACKGROUND OF THE INVENTION

The present invention relates to a system for controlling an electromagnetic clutch for an automatic transmission.

An automobile provided with a continuously variable belt-drive transmission with an electromagnetic clutch is disclosed in EP-A No. 151038. The electromagnetic clutch of the transmission is controlled by a control system to provide various operational modes such as a starting mode, reverse excitation mode, drag mode, and two modes of lock-up engagement which are an accelerator pedal releasing condition and depression condition. One of the modes is selected in accordance with a position of a selector lever and driving conditions to control the electromagnetic clutch.

In the system, as shown in FIG. 8, relationships between engine speed and vehicle speed are illustrated. At the start of the vehicle, the transmission ratio is set at a maximum value. When the accelerator pedal of the vehicle is depressed and engine speed becomes higher than a set value, the electromagnetic clutch is engaged to start the vehicle. The vehicle speed and engine speed increase along the set maximum transmission ratio represented by (line L,Ne/V). When the engine speed and vehicle speed reach set values at point A under a driving condition, the transmission ratio starts to change (it upshifts) at point A of FIG. 8. At that time if the engine speed is kept constant, the transmission ratio is automatically and continuously reduced along horizontal line m (representing engine speed as constant) and finally reaches a minimum transmission ratio (line H). When the accelerator pedal is released, the engine speed and vehicle speed reduce along the line H. When both speeds reach a point B, the transmission ratio begins to increase. Thus, the transmission ratio is increased (downshifted) along a line M and reaches the maximum transmission ratio (line L). However under certain driving conditions the engine speed becomes Neu, as shown by a line M' in FIG. 8, namely, the engine speed becomes higher than the predetermined engine speed, which corresponds to the minimum changing line M of the transmission ratio, in a low vehicle speed range under $V_H$ when a choke valve is closed. In such a state, the vehicle is accelerated because of the high engine speed regardless of the intention of the driver. In order to prevent the acceleration of the vehicle, the driver depresses a brake pedal to brake the vehicle. However, since the electromagnetic clutch is locked at a vehicle speed higher than a predetermined speed $V_L$ (FIG. 8), a large force must be applied to the brake pedal.

SUMMARY OF THE INVENTION

The object of the present invention is to provide a system which operates to slip the electromagnetic clutch, when a vehicle is driven in lock-up state of the clutch under the choking condition, whereby the vehicle can be braked by a small braking force, moreover preventing elevation of the temperature of the clutch by a necessary minimum slipping.

According to the present invention, there is provided a system for controlling an electromagnetic clutch for a motor vehicle having a continuously variable transmission, which has a drive range, reverse range and neutral range, and a selector lever for selecting the ranges. The system comprises vehicle speed detecting means for producing a first vehicle speed signal at a predetermined low speed and a second vehicle speed signal when vehicle speed is between the predetermined low speed and a predetermined speed higher than the low speed, first switch means for detecting the position of the selector lever and for producing a drive signal when the selector lever is at drive range position, second switch means for producing a release signal dependent on the release of an accelerator pedal of the vehicle, third switch means for producing a choke signal when a choke valve is closed, first control means responsive to the first vehicle speed signal and to the drive signal for producing a lock-up current signal, second control means responsive to the second vehicle speed signal and to the release signal for producing a current reducing signal, and output decision means responsive to the lock-up current signal for controlling the current passing through a coil in the electromagnetic clutch to lock-up the clutch and respectively to the current reducing signal for reducing the current to slip the clutch.

The other objects and features of this invention will become understood from the following description with reference to the accompanying drawings.

DETAILED DESCRIPTION OF THE PREFERRED EMBODIMENT

Figure 1A:
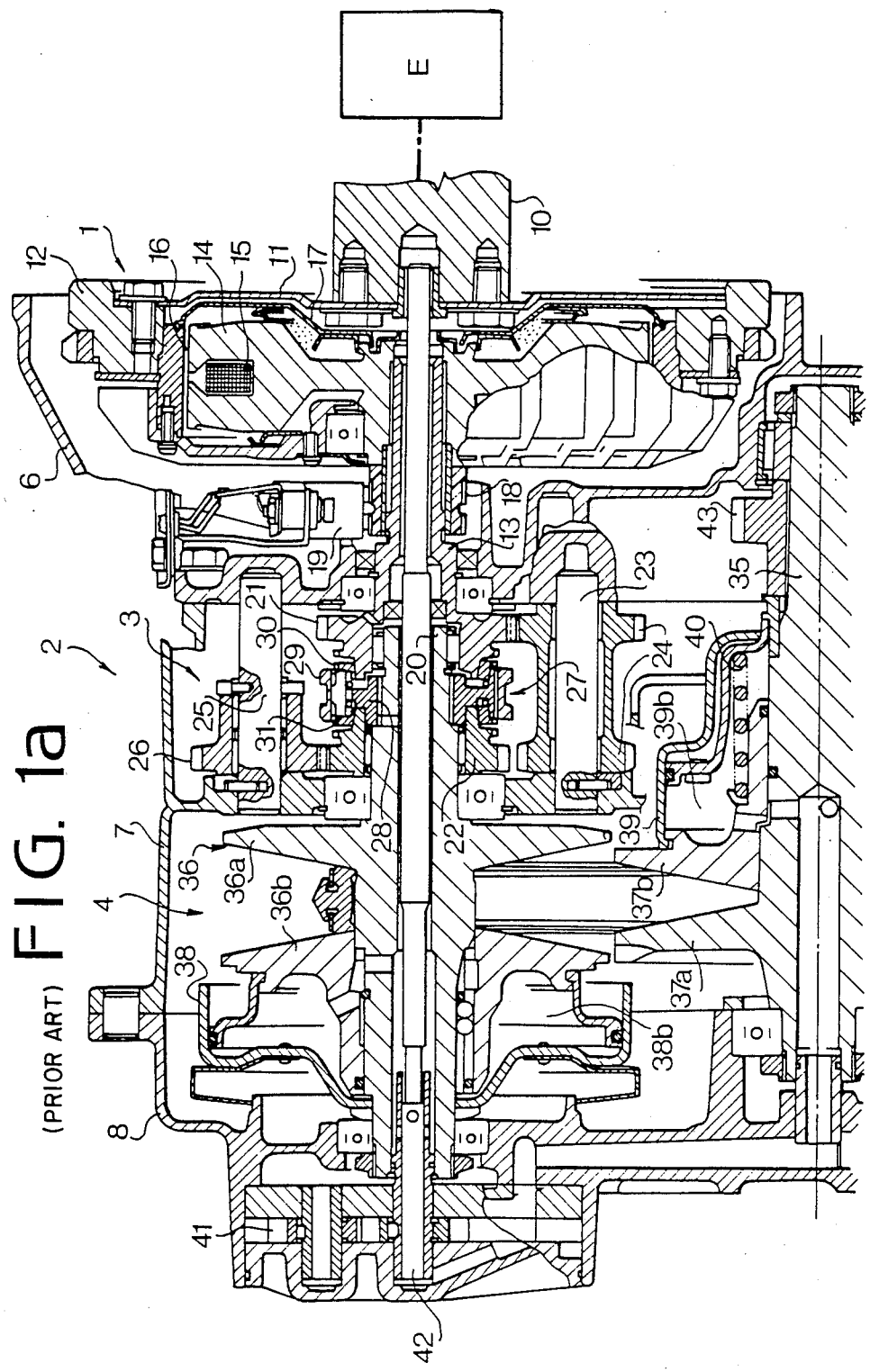
FIGS. 1a and 1b are sectional views of a continuously variable belt-drive transmission to which the present invention is applied.
Figure 1B:
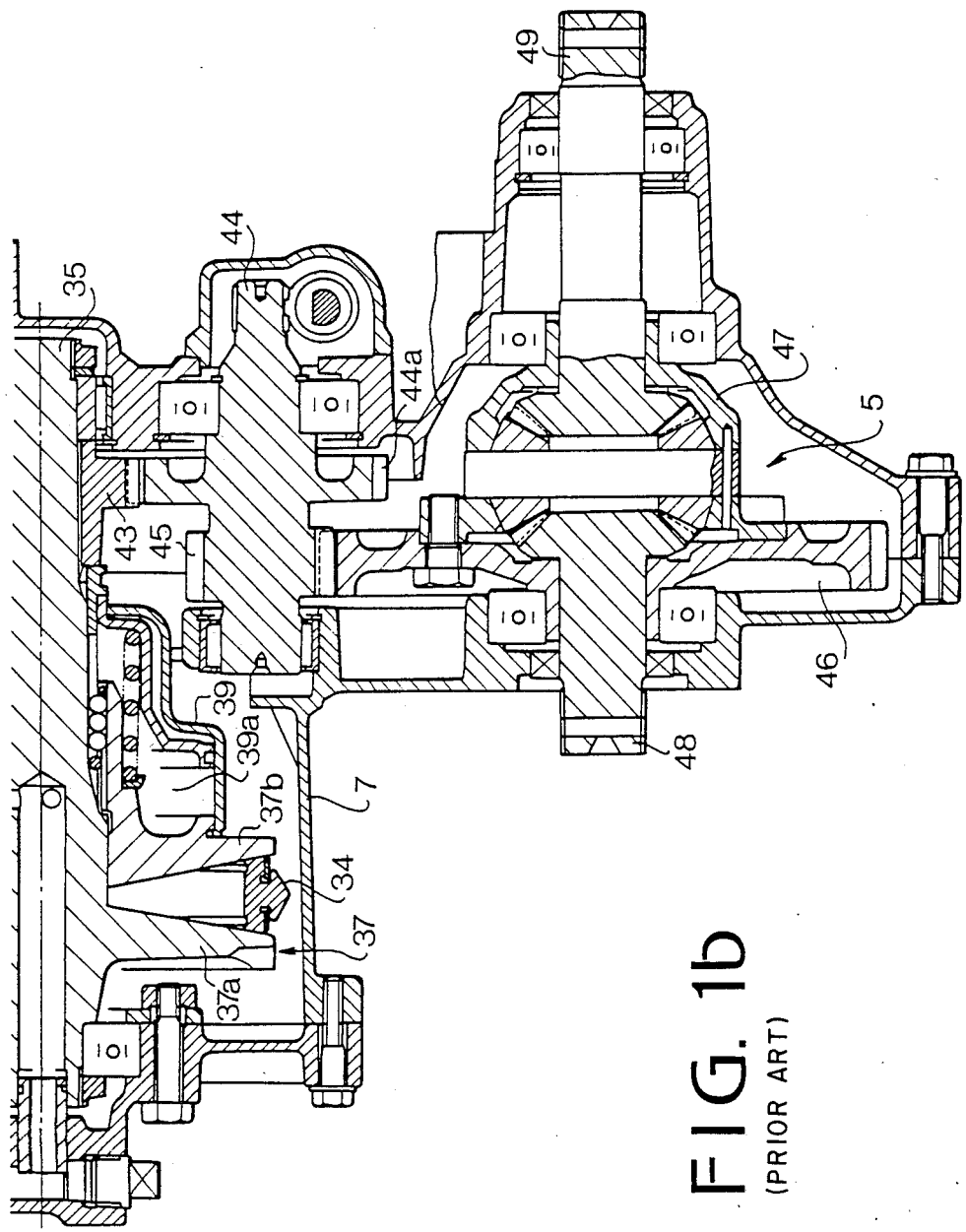

Referring to FIGS. 1a and 1b, a continuously variable belt-drive automatic transmission for a vehicle, to which the present invention is applied, comprises an electromagnetic powder clutch 1, a continuously variable belt-drive transmission 2, a selector device 3, pulleys and belt device 4, final reduction device 5, and a pressure oil control circuit (not shown). The electromagnetic powder clutch 1 is provided in a housing 6. The selector device 3, pulleys and belt device 4, and final reduction device 5 are provided in a main housing 7 and a side housing 8. A crankshaft 10 of an engine E is connected to an annular drive member 12 through a drive plate 11 of the electromagnetic powder clutch 1. The electromagnetic powder clutch comprises a driven member 14, an a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N-range) or a parking position (P-range) of a selector lever 50 (FIG. 2), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range (D-range) or a high engine speed drive range (Ds-range).

When the sleeve 29 is engaged with the gear 22, the input shaft 13 is connected to the main shaft 20 through gears 21, 24, 26 and 22 to provide a reverse driving position (R-range).

The main shaft 20 has an axial passage in which an oil pump driving shaft 42 directly connected to the crankshaft 10 is mounted. An output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder secured to the main shaft 20 to form a servo device 38. A chamber 38b of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b has a cylindrical portion in which a piston portion of the output shaft 35 is slidably engaged to form a servo device 39. A chamber 39b of the servo device 39 is communicated with the oil pump 41 through the pressure oil control circuit. A spring 40 is provided to urge the movable conical disc 37b toward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

The pressure oil control circuit is responsive to vehicle speed, engine speed and throttle valve position for controlling the oil from the oil pump 41 to the servo devices 38 and 39 thereby to move discs 36b and 37b. Thus, the transmission ratio is continuously changed. When the Ds range is selected, the transmission ratio is increased by the operation of the pressure oil control circuit.

Figure 2:
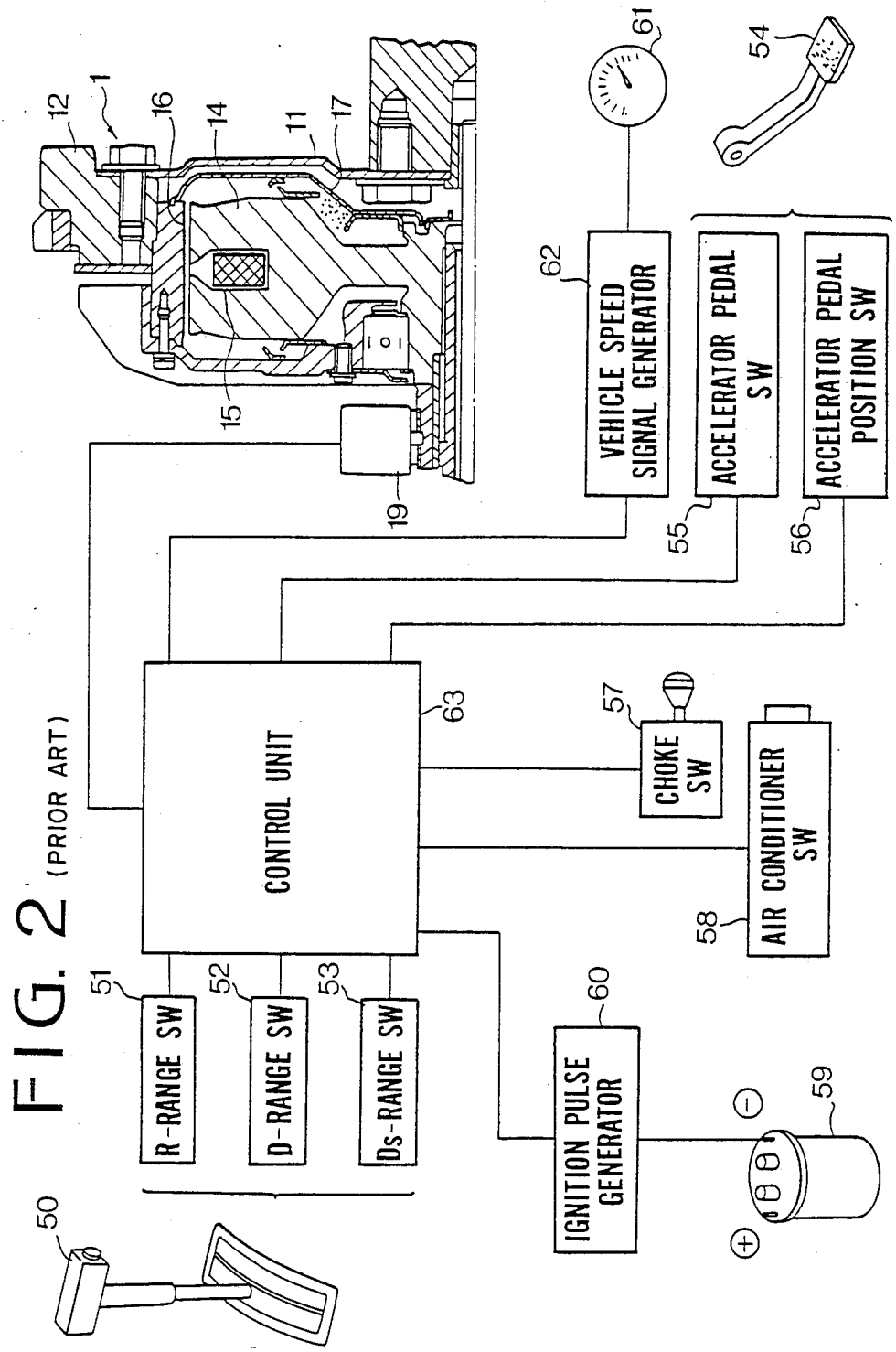
FIG. 2 is a schematic diagram showing a control system according to the present invention.

Referring to FIG. 2 showing a control system, an R-range switch 51, D-range switch 52, and Ds-range switch 53 are provided to produce high level output signals at respective positions of the selector lever 50. An accelerator pedal switch 55 is provided to produce an output signal when an accelerator pedal 54 of the vehicle is depressed, and an accelerator pedal position switch 56 is provided to produce an output signal when the accelerator pedal is depressed over a predetermined degree. The accelerator pedal switch 55 and accelerator pedal position switch 56 may be substituted with a throttle valve switch and throttle position switch, respectively. A choke switch 57 produces an output signal when a choke valve of the engine is closed, and an air conditioner switch 58 produces an output signal at the operation of an air conditioner. An ignition pulse generator 60 produces pulses dependent on the ignition signal from an ignition coil 59, representing engine speed. A vehicle speed signal generator 62 produces pulses dependent on an output from a speedometer 61. These output signals and pulses are applied to a control unit 63 which controls the clutch current in dependency on the input signals.

Figure 3A:
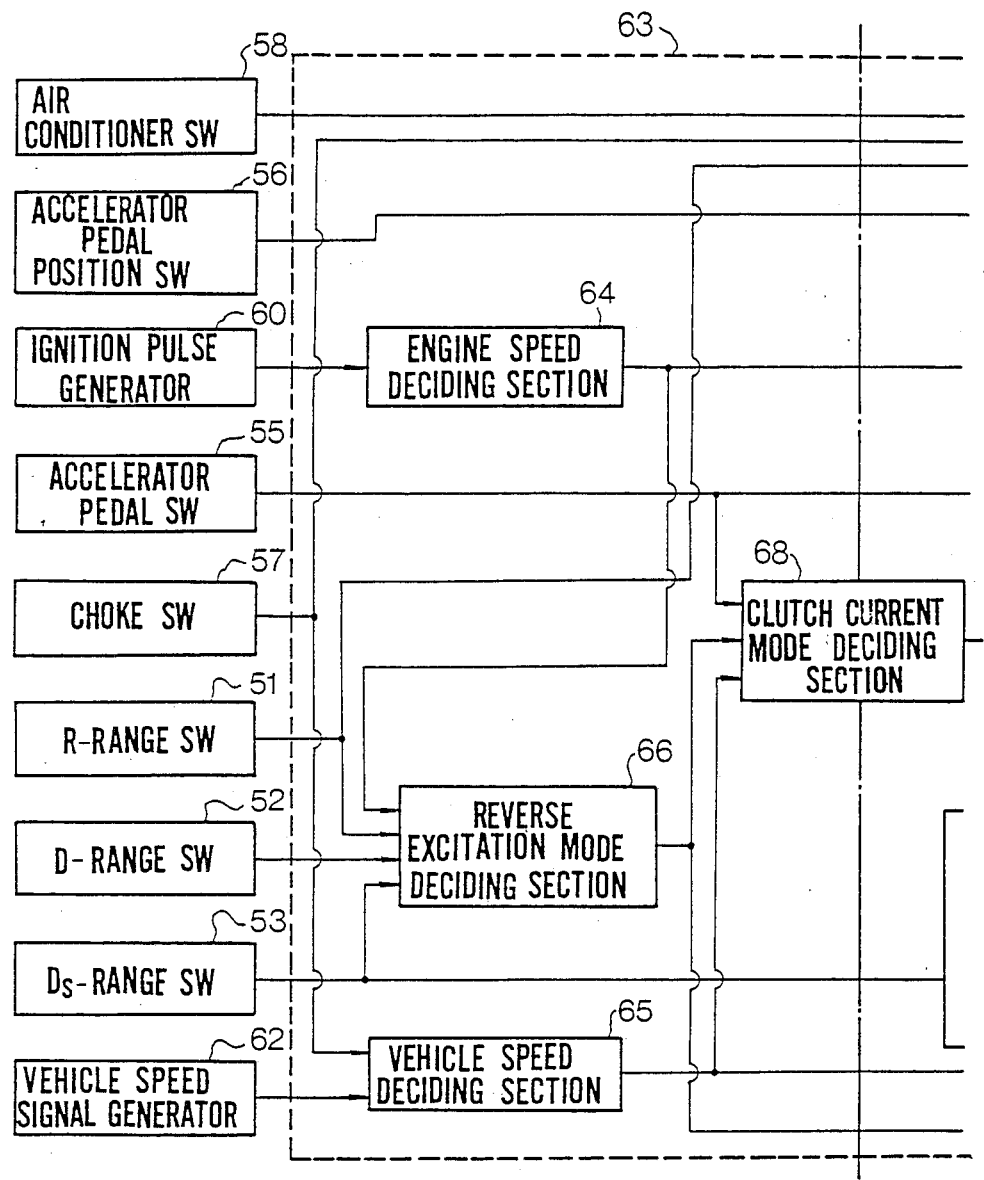
FIGS. 3a and 3b show a block diagram of a control unit according to the present invention.
Figure 3B:
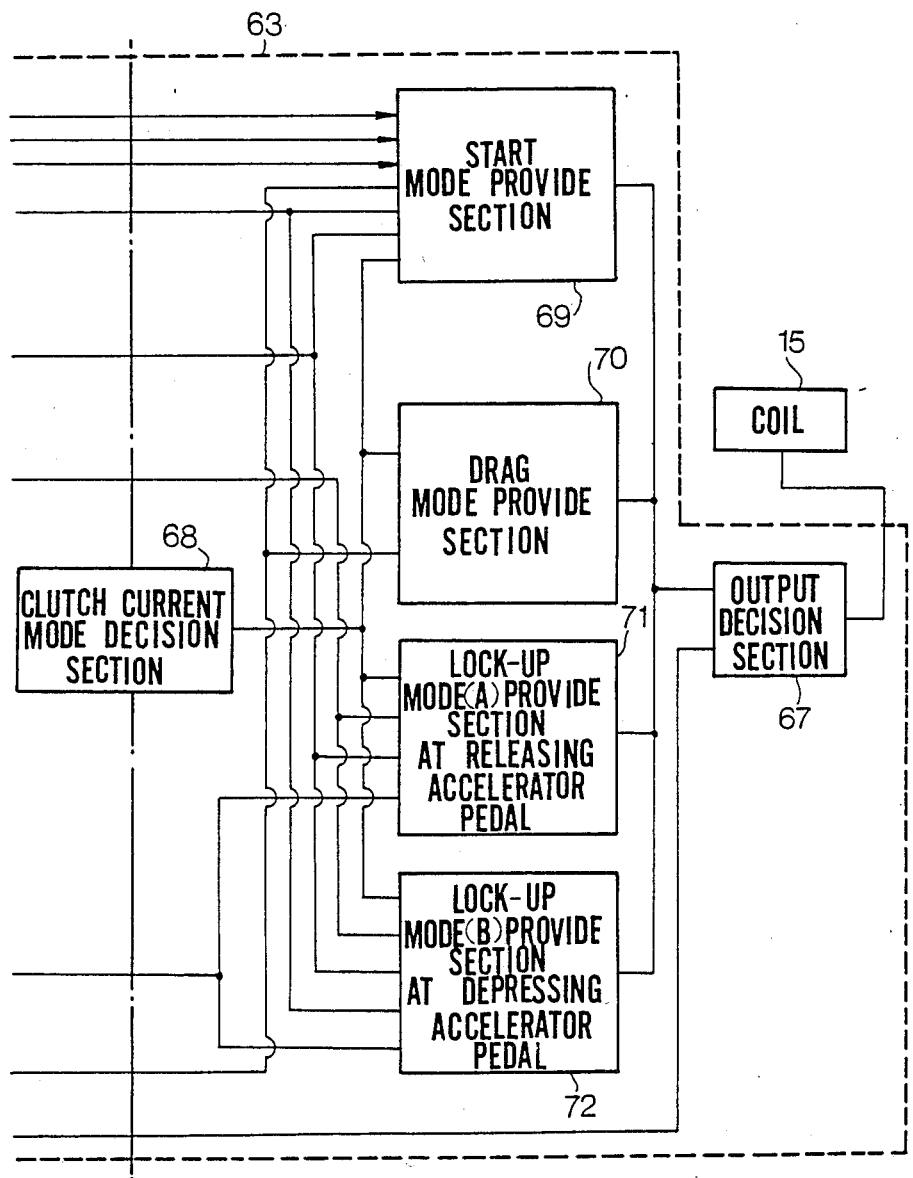

Referring to FIGS. 3a and 3b, the control unit 63 is provided with an engine speed deciding section 64 applied with the ignition pulses from the generator 60, and a vehicle speed deciding section 65 applied with the pulses from the generator 62. A reverse excitation mode deciding section 66 decides that output signals from R-range switch 51, D-range switch 52 and Ds-range switch 53 are at low levels, and the transmission is at P-range or N-range, and produces a reverse excitation signal. The reverse excitation signal is applied to an output deciding section 67, so that a small reverse current flows in the coil 15 to excite the coil in reverse. When engine speed is below 300 rpm, an engine speed deciding section 64 produces a low engine speed signal which is applied to the reverse excitation mode deciding section 66 to excite the coil 15 in reverse. The output signals of the accelerator pedal depression switch 55 and vehicle speed deciding section 65, and the drive range select signals from the reverse excitation mode deciding section 66 are applied to a clutch current mode deciding section 68, outputs of which are applied to a start mode providing section 69, drag mode provide section 70, clutch lock-up mode (A) provide section 71 at releasing the accelerator pedal and clutch lock-up mode (B) provide section 72 at depression of the accelerator pedal.

Figure 8:
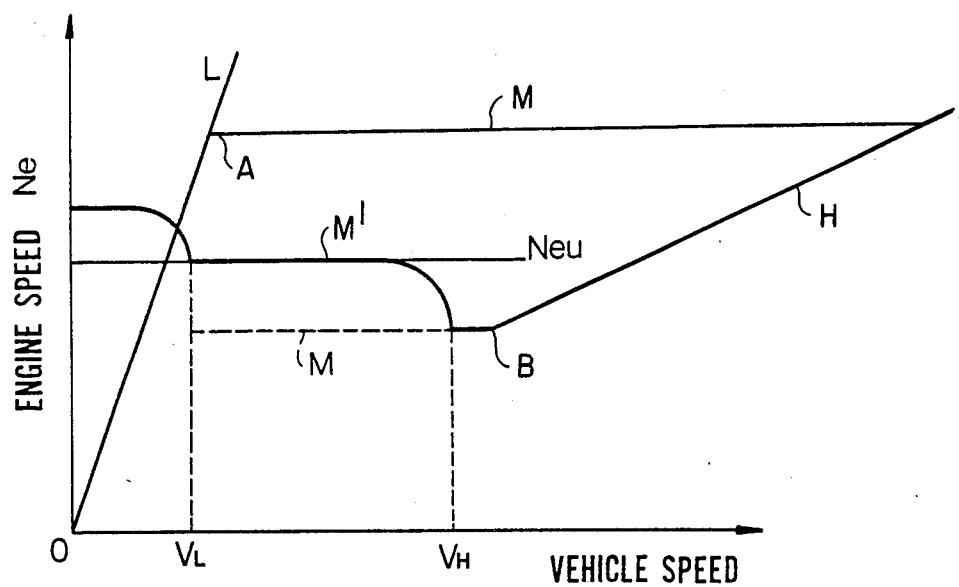
FIG. 8 is a graph showing relationships between engine speed and vehicle speed in the prior art and the present invention.

The start mode provide section 69 decides clutch current dependent on the engine speed represented by the output from the engine speed deciding section 64. When the choke switch 57 or air conditioner switch 58 is turned on, clutch current having a high stall speed is decided. When the accelerator pedal is released, the drag mode provide section 70 decides a small drag current dependent on an output representing low vehicle speed from the vehicle speed deciding section 65 and on the output of the clutch current mode deciding section 68 at the release of the accelerator pedal. When the vehicle speed decreases below a predetermined low speed, the clutch current becomes zero to disengage the clutch. The clutch lock-up mode (A) provide section 71 decides a small lock-up current in response to the output of the accelerator pedal switch 55 at the release thereof at middle and high vehicle speed. In accordance with present invention, when the choke switch 57 is ON, the characteristic of the clutch current is decided dependent on output signals of the accelerator pedal position switch 56, engine speed deciding section 64 and vehicle speed deciding section 65. While the vehicle speed is below a predetermined speed $V_H$ (FIG. 8), which is higher than the lock-up speed $V_L$, and the engine speed is above predetermined speed (for example speed M), the clutch current is decreased so as to increase slipping of the clutch. The clutch current is increased to reduce the slipping of the clutch when the engine speed decreases below the predetermined speed. When Ds-range switch 53 is ON, the clutch current is cut off at a lower vehicle speed than the D-range. The clutch lock-up mode (B) provide section 72 decides a large lock-up current in response to the output of the accelerator pedal switch at the depression at middle and high vehicle speed. Clutch current at the Ds-range is the same as the mode (A). Outputs of sections 69 to 72 are applied to the output deciding section 67 to control the clutch current.

Figure 4:
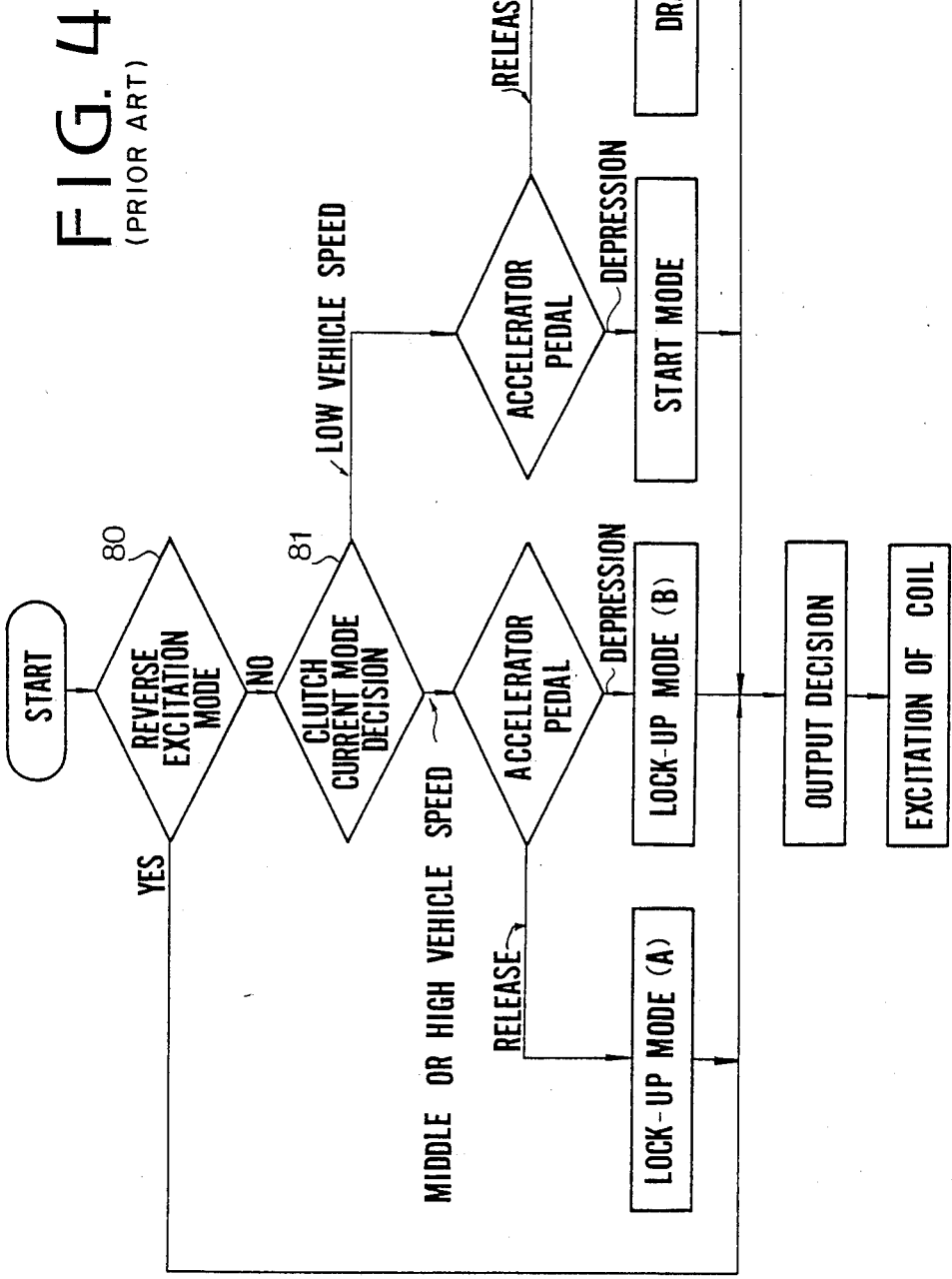
FIG. 4 is a flow chart showing the operation of the control system.
Figure 5:
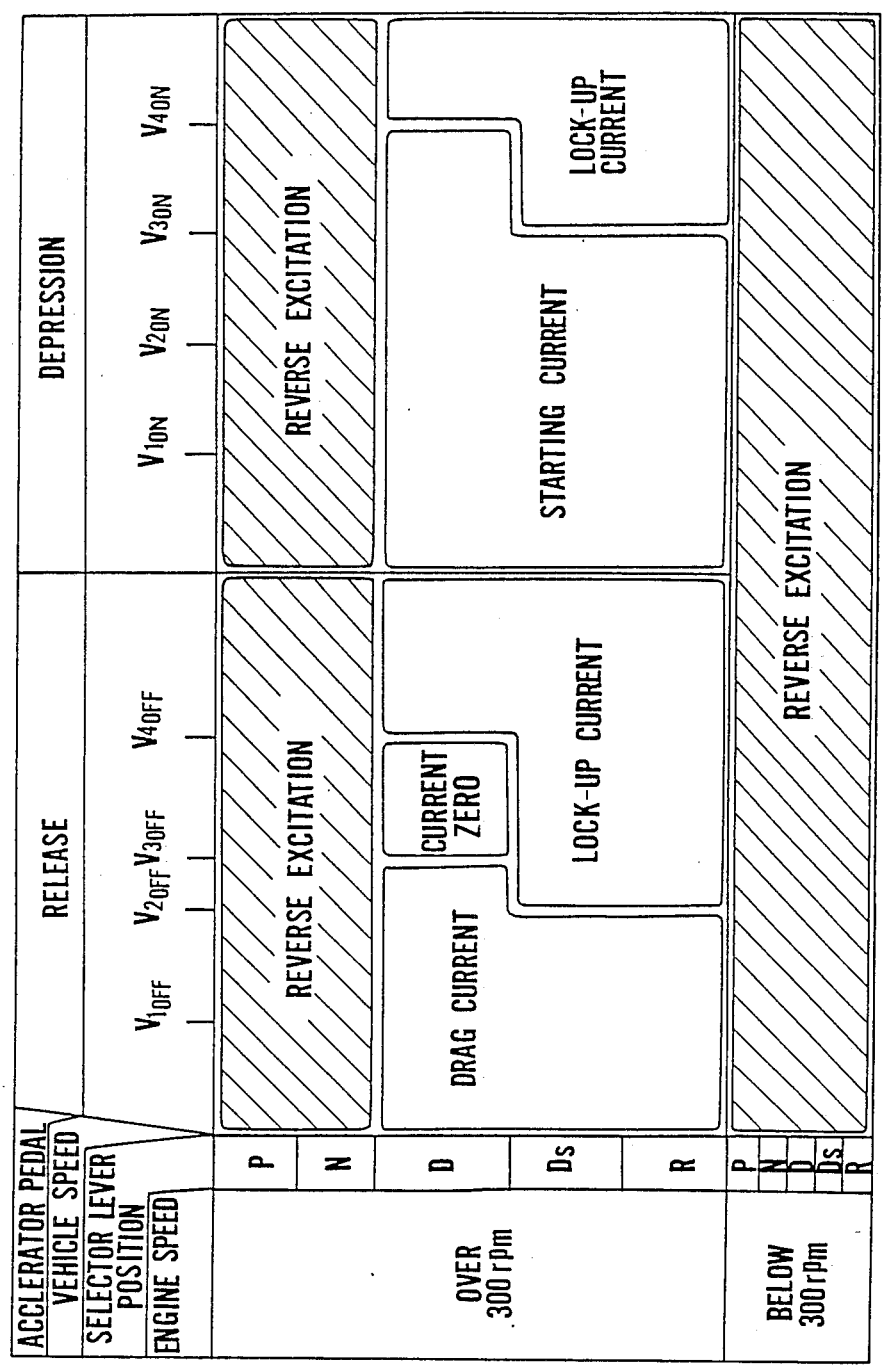
FIG. 5 is a graph showing regions of various modes.

Describing the operation of the control system with reference to FIGS. 4 and 5, at a deciding step 80 (FIG. 4), it is determined whether the vehicle is at the reverse excitation mode. If the reverse excitation mode is detected, reverse clutch current flows in the coil 15. When engine speed is at a very low speed, for example below 300 rpm, the reverse clutch current flows at all ranges (FIG. 5). At a deciding step 81, clutch current supply mode is determined. If the accelerator pedal is released at a low vehicle speed, the clutch current is cut off or a small drag current flows. If the accelerator pedal is depressed, clutch current for starting the vehicle flows. At middle or high vehicle speed, when the accelerator pedal is released, a small lock-up current (mode A) flows, and at the depression of the pedal, a large lock-up current (mode B) flows.

Figure 6:
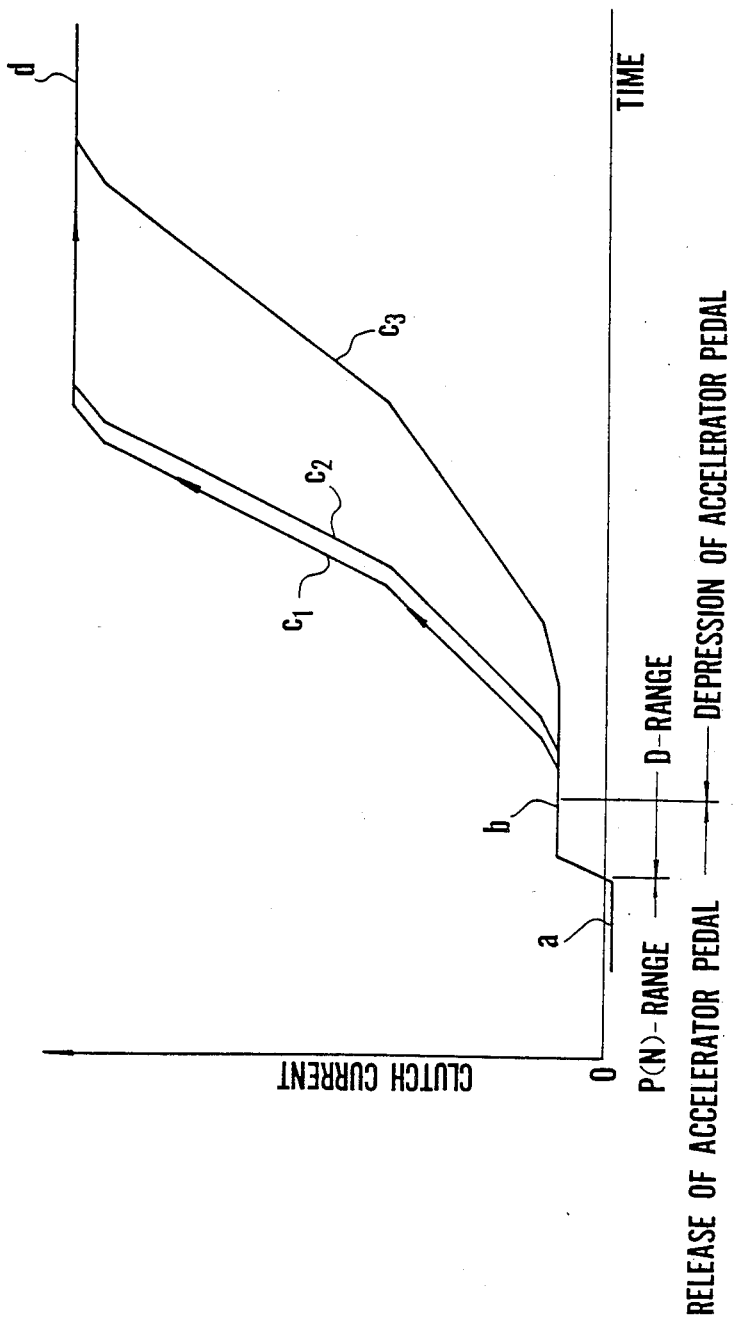
FIGS. 6 and 7 are graphs showing variation of clutch current.
Figure 7:
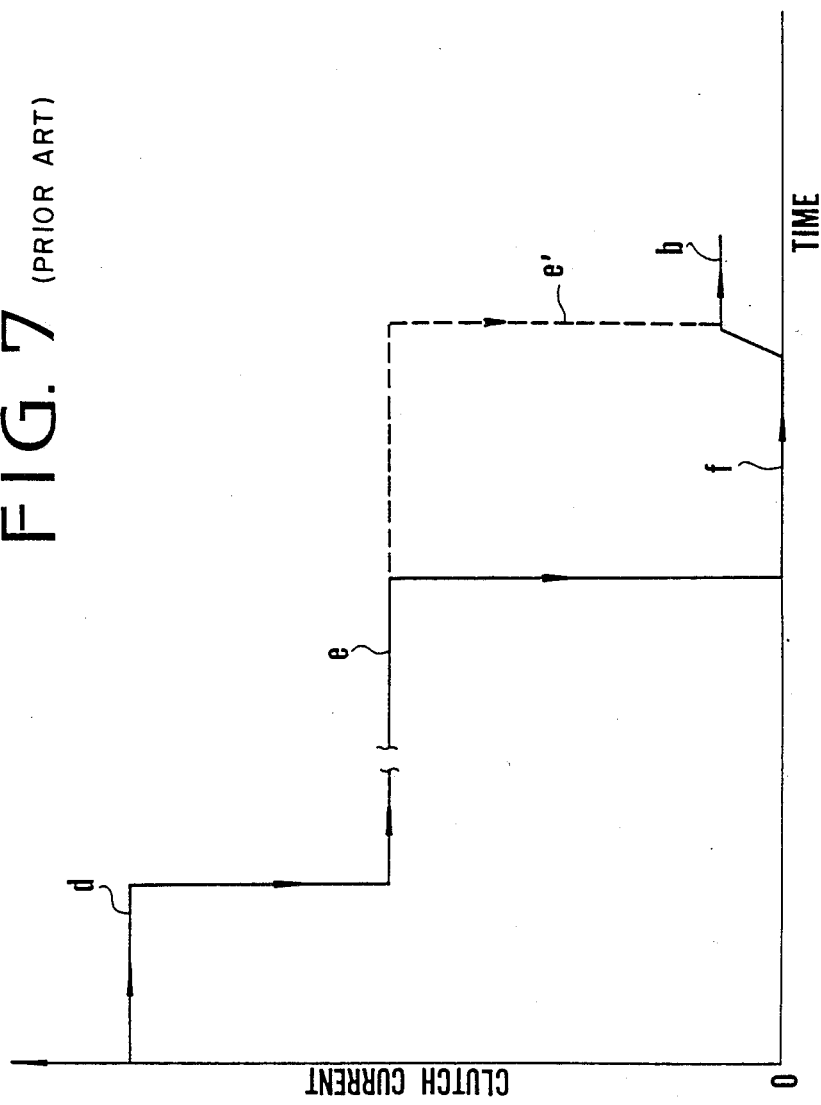
Figure 9:
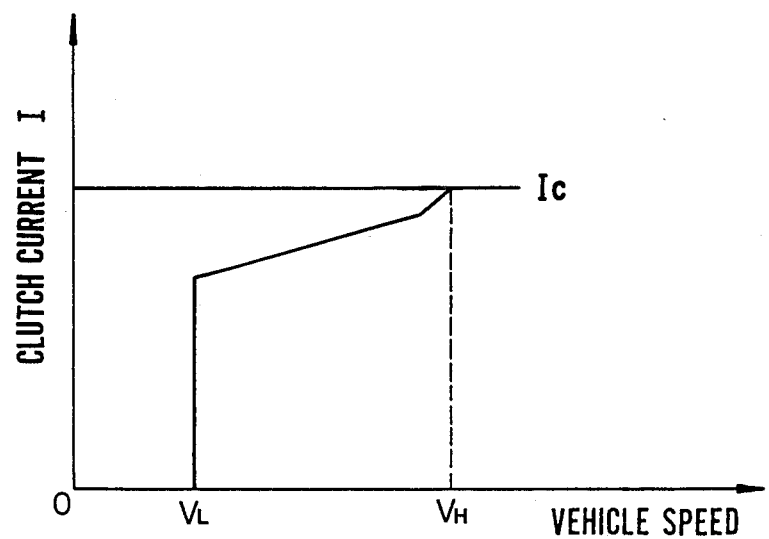
FIG. 9 is a graph showing relationship between vehicle speed and clutch current.
Figure 10:
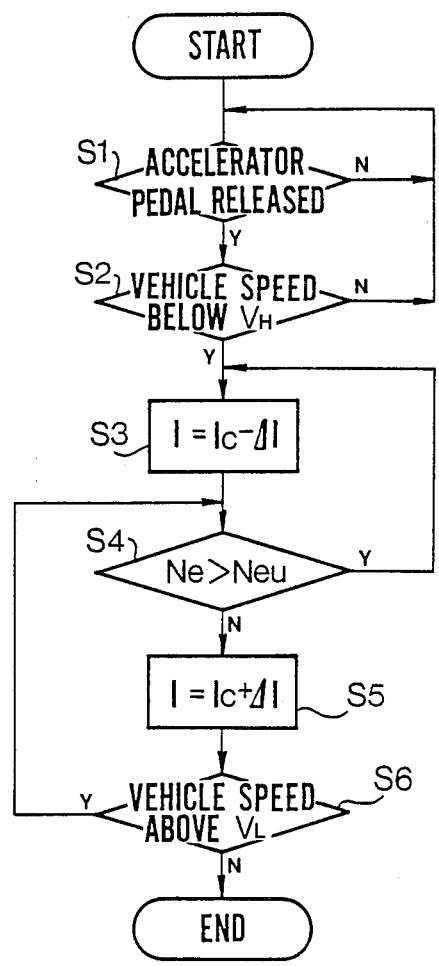
FIG. 10 is a flowchart showing the operation of the system according to the present invention.

When the choke switch 57 is ON, the clutch current is controlled in accordance with the flowchart in FIG. 10. At a step S1, it is determined whether the accelerator pedal is released. If the accelerator pedal is released, the vehicle speed is detected at a step S2. If the vehicle speed is lower than the predetermined low speed $V_H$, (FIG. 8) the clutch current I (FIG. 9) is decreased at a step S3 by subtracting $\Delta I$ from the amount of the basic current Ic (which is in the present case, a lock-up current). Thus, slipping of the clutch increases. At a step S4, it is decided whether the engine speed Ne is higher than a predetermined speed Neu or not. When Ne is higher than Neu, the program is returned to step S3 for further reducing the clutch current, thereby increasing the slipping of the clutch. If the engine speed Ne is lower than Neu, the clutch current I is increased by adding $\Delta I$ to Ic (Ic+$\Delta I$) at a step S5. At a step S6, it is further decided whether the vehicle speed is higher or lower than the predetermined lock-up speed $V_L$ of FIG. 8. If the vehicle speed is higher than the predetermined speed, the program is returned to step S4. If it is lower, the program ends. Thus, the vehicle speed is controlled to a proper speed without braking the vehicle, avoiding the elevating of the temperature of the clutch Referring to FIGS. 6 and 7, at the N-range or P-range, a reverse current flows in the coil. At the D-range, if the accelerator pedal is not depressed, a small drag current b flows to produce a small drag torque, thereby reducing the amount of backlash between gears and decreasing the static friction torque in the belt and pulley device. When the accelerator pedal is depressed, a clutch current $c_1$ flows in proportion to engine speed. Clutch current $c_2$ flows under the operation of the air conditioner, and clutch current $c_3$ is for the operation when the choke valve is closed. When vehicle speed reaches a predetermined speed ($V_3$ or $V_4$ in FIG. 5), a large lock-up current d for entirely engaging the clutch flows to lock up the clutch. When the accelerator pedal is released to decelerate the vehicle, a small lock-up current flows, so that electric power consumption is reduced. When the vehicle speed decreases below a predetermined value ($V_4$ in FIG. 5), the clutch current becomes zero f. When the vehicle speed further decreases below a predetermined value ($V_3$ or $V_2$), the small drag current b flows. When the vehicle is decelerated at the Ds-range or R-range, the small drag current b flows at a lower vehicle speed than the D-range as shown by reference e' in FIG. 7. Thus, sufficient engine braking effect is provided in a lower vehicle speed range.

From the foregoing, it will be understood that in the system of the present invention, when the choke valve is closed, the clutch in lock-up mode slips, so that acceleration of the vehicle is controlled. Accordingly, since braking of the vehicle is not necessary, elevation of the temperature of the clutch can be prevented.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. In a system for a motor vehicle having an engine, an accelerator pedal for controlling air-fuel ratio of fuel mixture supplied to the engine, a choke valve for controlling the air-fuel ratio of the fuel mixture at a cold engine condition, a continuously variable transmission, an electromagnetic clutch having a coil for operating the clutch for transmitting the power of the engine to the transmission, the transmission having a drive range, reverse range and neutral range, and a selector lever for selecting the ranges, the improvement in the system comprising:

vehicle speed detecting means for producing a first vehicle speed signal at a first predetermined low speed and respectively a second vehicle speed signal when vehicle speed is between said first predetermined low speed and a second predetermined speed higher than said first low speed;

drive range detecting means for detecting the position of said selector lever and for producing a drive signal when said selector lever is at a drive range position;

switch means for producing a release signal during release of the accelerator pedal;

means for producing a choke signal when the choke valve of the engine is closed;

first control means responsive to said first vehicle speed signal and to said drive signal for producing a lock-up current signal;

second control means responsive to said second vehicle speed signal, said release signal and said choke signal for producing a current reducing signal;

clutch current control means responsive to said lock-up current signal for controlling current passing through the coil in said electromagnetic clutch to lock-up said electromagnetic clutch, and respectively responsive to the current reducing signal for reducing the current through the coil to slightly slip said clutch, so as to prevent elevation of temperature of the clutch at cold engine.

2. The system according to claim 1, wherein
said clutch current control means reduces the current little by little when engine speed is higher than a predetermined value.

3. The system according to claim 2, wherein
said clutch current output control means increases the current to reduce the slipping of the clutch when the engine speed is lower than said predetermined value.

* * * * *